United States Patent [19]

Range et al.

[11] Patent Number: 4,842,192
[45] Date of Patent: Jun. 27, 1989

[54] MICROPROCESSOR CONTROLLED THERMOSTAT FOR DRYER

[75] Inventors: Michael E. Range, Lincoln Township, Berrien County; David P. Langendonk, Coloma Township, Berrien County, both of Mich.

[73] Assignee: Whirlpool Corporation, Benton Harbor, Mich.

[21] Appl. No.: 139,388

[22] Filed: Dec. 30, 1987

[51] Int. Cl.⁴ .............................................. G05D 23/00
[52] U.S. Cl. ................................ 236/68 B; 236/46 F; 34/48; 219/511
[58] Field of Search ................ 236/68 B, 68 C, 46 F, 236/46 R; 34/48; 219/492, 501, 502, 511

[56] References Cited

U.S. PATENT DOCUMENTS

| | | | |
|---|---|---|---|
| 4,233,498 | 11/1980 | Payne et al. | 219/506 X |
| 4,270,693 | 6/1981 | Hayes | 236/46 F |
| 4,404,462 | 9/1983 | Murray | 219/501 X |
| 4,524,908 | 6/1985 | Marshall et al. | 236/68 B X |
| 4,552,304 | 11/1985 | Papazian | 236/46 F |

FOREIGN PATENT DOCUMENTS

| | | | |
|---|---|---|---|
| 2305776 | 10/1976 | France | 236/68 B |
| 0098220 | 6/1984 | Japan | 236/46 F |

Primary Examiner—Harry B. Tanner
Attorney, Agent, or Firm—Hill, Van Santen, Steadman & Simpson

[57] ABSTRACT

A thermostat controlled circuit for a bias heater located adjacent the thermostat connected to a source of alternating electrical power. The control circuit has a manually operated switch for providing a temperature level signal. A triac having a gate terminal and first and second terminals connected in series with the AC power source and the bias heater is provided. A transistor circuit controls the operation of the triac and is connected to the gate of the triac to provide a signal for turning on the triac periodically. The microprocessor supplies an enable signal to the transistor circuit at predetermined time intervals to cause the transistor circuit to activate the triac. The triac turns off at the next zero crossing of the AC line current after the microprocessor has removed the enable signal from the transistor circuit. The point in time of turning on the triac may be synchronous or asynchronous with the AC line current. The bias heater supplies heat to a thermostat in the discharge duct of a clothes dryer which combines with heat supplied by air exiting the clothes dryer and controls the point in time at which the thermostat opens and closes.

15 Claims, 2 Drawing Sheets

MICROPROCESSOR CONTROLLED THERMOSTAT FOR DRYER

BACKGROUND OF THE INVENTION

1. Field of the Invention

The present invention relates in general to dryers and more particularly to air dryers, such as the type of air dryers wherein articles are placed in a chamber and heated air is passed through the chamber, such as in a clothes dryer.

2. Description of the Prior Art

A typical air dryer for drying articles such as clothes, has an outer cabinet, a rotatable drum within the cabinet, a fan for drawing air in through the cabinet and passing it to the drum and a discharge duct for exhausting the air from the drum to the atmosphere. Usually, dryers of this type have one or more electrical heating elements located in the inlet air duct to heat the air before it passes to the drum. Alternatively, the heat is supplied from a source of gas. Conventionally, dryers of this type have a main on/off switch and an adjustable timer so that a user can select any one of a range of drying times. A heating control switch ultimately varies the amount of power supplied to the heating elements.

In order to control the temperature of the air flowing through the drum in the dryer a thermostat element is provided, typically in the discharge duct. A bias heater is physically located next to the thermostat element and supplies additional energy to the thermostat element depending upon the temperature setting which the user has selected for the dryer. The thermostat element breaks the high current to the heaters in the inlet duct when the thermostat is heated to a predetermined point which is determined by the temperature of the air in the discharge duct plus the energy supply from the bias heater. Thus, the more energy which is supplied to the bias heater, the lower the temperature of the air flowing through the drum and vice versa.

Modern dryers typically are microprocessor controlled and the number of actual controls which the user has access to is less than for older type dryers. Prior art control circuits for dryers using a microprocessor typically have involved complex circuitry often including analog to digital converters. The present invention provides a simpler solution to a control circuit in a microprocessor controlled dryer and especially without the use of analog to digital converters.

SUMMARY OF THE INVENTION

The present invention relates to a thermostat control circuit for a bias heater element located adjacent a thermostat which is connected to a source of alternating electrical power. The control circuit in general has a device which provides a temperature level signal. The device may be a switch on the dryer which the user has access to. A triac with a gate terminal has its first and second terminals connected in series with the AC power source and the bias heater. A transistor circuit provides a signal to the gate of the triac to turn on the triac. The triac turns off at every zero crossing of the AC current flowing through the triac. The AC current has a predetermined time period. The microprocessor provides a signal to the transistor circuit to cause the transistor circuit to turn on and provide the signal to the gate of the triac. The microprocessor turns on the transistor circuit in response to the temperature level signal. Depending upon the temperature level selected by the user, the microprocessor periodically causes the triac to be turned on thus supplying energy to the bias heater. The triac may be turned on for every half cycle of the AC current flowing through the triac to supply a large amount of energy to the bias heater thereby establishing a lower temperature within the drum of the dryer. Conversely, the microprocessor may cause the triac to be turned on once every fourth cycle of the AC current, for example, thus providing less energy to the bias heater and thereby providing a higher temperature of air in the drum of the dryer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
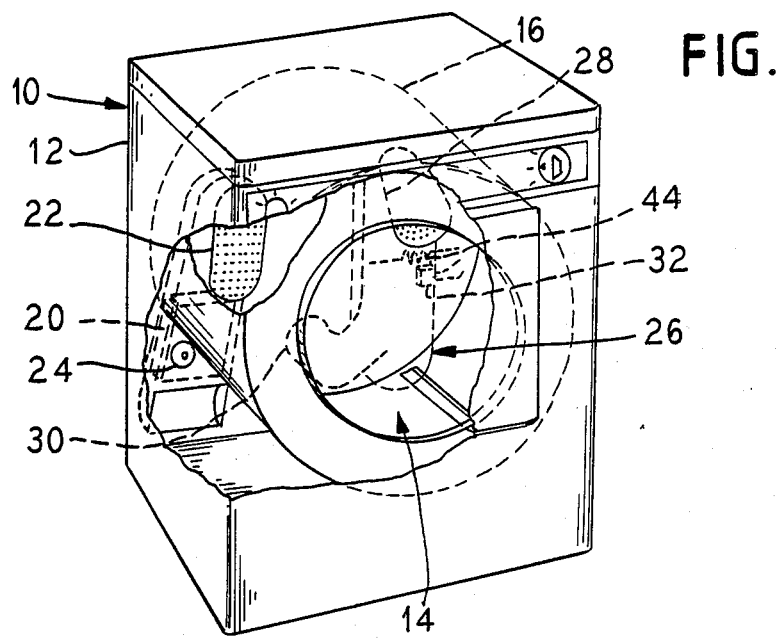
FIG. 1 is a perspective view, partially cut away, of a clothes dryer utilizing the present invention.

The present invention has general applicability but is most advantageously utilized in a clothes dryer of the type shown in FIG. 1. The clothes dryer 10 has an outer cabinet 12 with an access part 14 in a front of the cabinet 12. Within the cabinet 12 there is provided a clothes tumbling drum 16 mounted for rotation about a horizontal central axis. The drum 16 is cylindrical in shape.

The clothes dryer 10 is typically provided with a control arrangement such that an operator, by manually setting a control knob 18 and activating a push to start switch (not shown) causes the machine to start and automatically proceed through a desired drying cycle.

The clothes dryer 10 is provided with an inlet duct 20 which has a cover grill 22 out of which air flows after being heated by a heating element 24 in the inlet duct 20. A blower housing assembly 26 is also provided and air from the drum 16 exits through a cover grill 28 through a discharge duct 30 and out to the atmosphere. Within the discharge duct 30 a thermostat 32 is located and adjacent the thermostat is a bias heater 44. A blower motor (not shown) causes air to be pulled out of the drum 16 thus causing the air to flow through the inlet duct 20 through the drum 16 and out through the discharge duct 30. As the air exits the drum 16 it flows over the thermostat 32. The thermostat 32 has a predetermined set point at which it will cause the heating elements 24 in the inlet duct to turn off. For example, the thermostat may be set at 75° C. The thermostat is heated by both the air flowing out of the drum 16 and by the bias heater 44.

Figure 2:
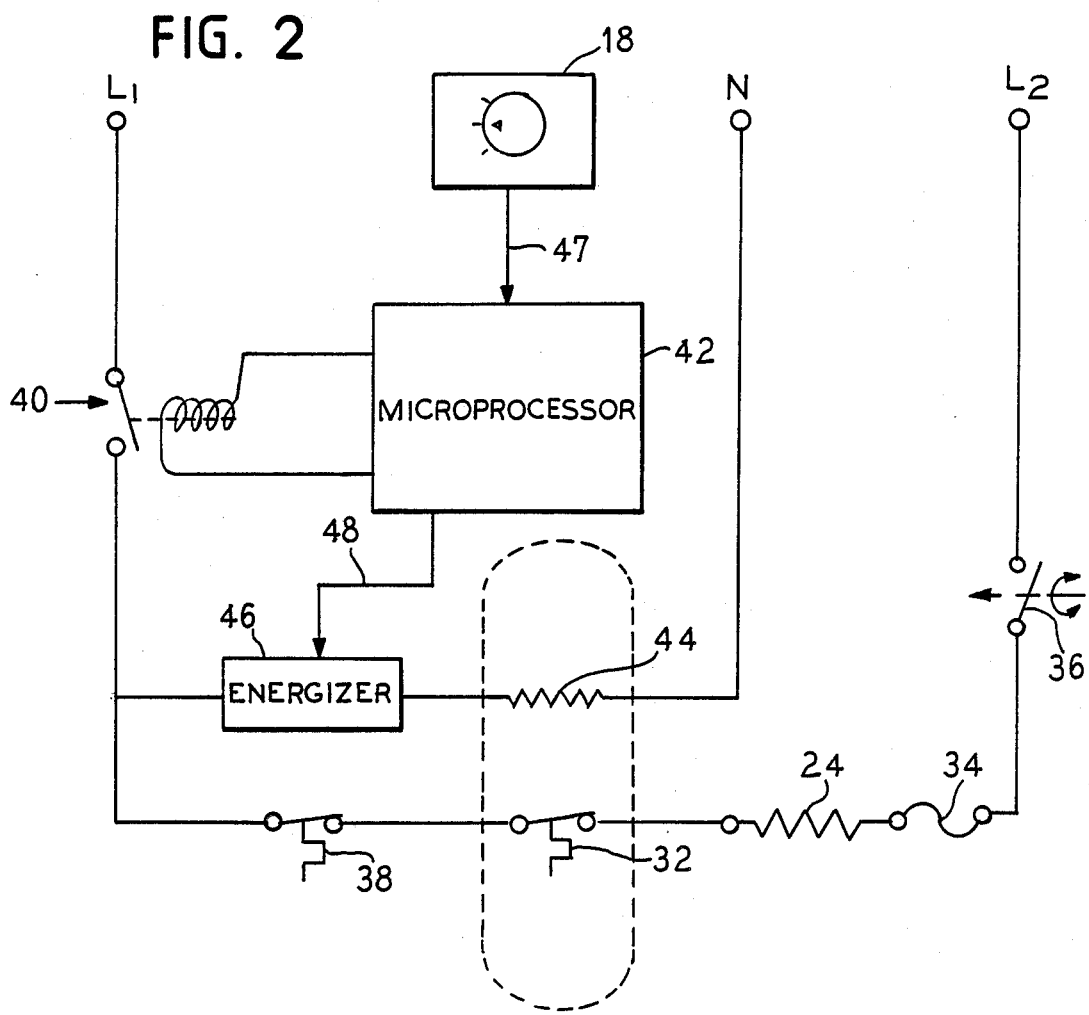
FIG. 2 is a general block diagram of the control circuit used in the FIG. 1 dryer.

FIG. 2 shows in general block diagram form a control circuit contained within the dryer 10 for use in controlling the temperature of the air flowing through the drum 16. Terminals L1 and L2 are connected to a source of alternating electrical power. In series with the terminals L1 and L2 are a main electrical heating element 24 and a safety fuse 34. Also in series is a centrifugal switch 36 which may typically be activated by the motor, not shown, reaching operating speed, thus operating as a safety device assuring that the heater operates only when the motor is operating at full speed. A thermal cut-out switch 38 is also used as a safety device. Also in series is relay 40 which is energized to turn on the dryer by the operator. That is, the operator in activating a switch for starting the dryer causes the microprocessor 42 to activate the relay 40. Also in series with the above-mentioned elements is the thermostat 32 which periodically turns the heating element 24 on and off to provide the proper temperature of air flowing through the drum 16. Located adjacent to the thermostat 32 is the bias heater 44. The bias heater 44 is connected in series with a means 46 for energizing the bias heater 44. The means 46 may be a switch, a relay or as will be explained below, a triac. The microprocessor 42 is preprogrammed to direct the functional operation of the various control system components within the clothes dryer 10. Not shown in FIG. 2 are other functions which the microprocessor 42 controls which are not related to the present invention.

In accordance with the present invention, the user after setting the temperature level control 18, causes a temperature level signal to be supplied on line 47 to the microprocessor 42. Typically the microprocessor 42 stores this information in a memory for use during the drying cycle. The microprocessor 42 periodically provides a enable signal on line 48 to the energizer 46 which thereby periodically turns on the bias heater 44.

Figure 3:
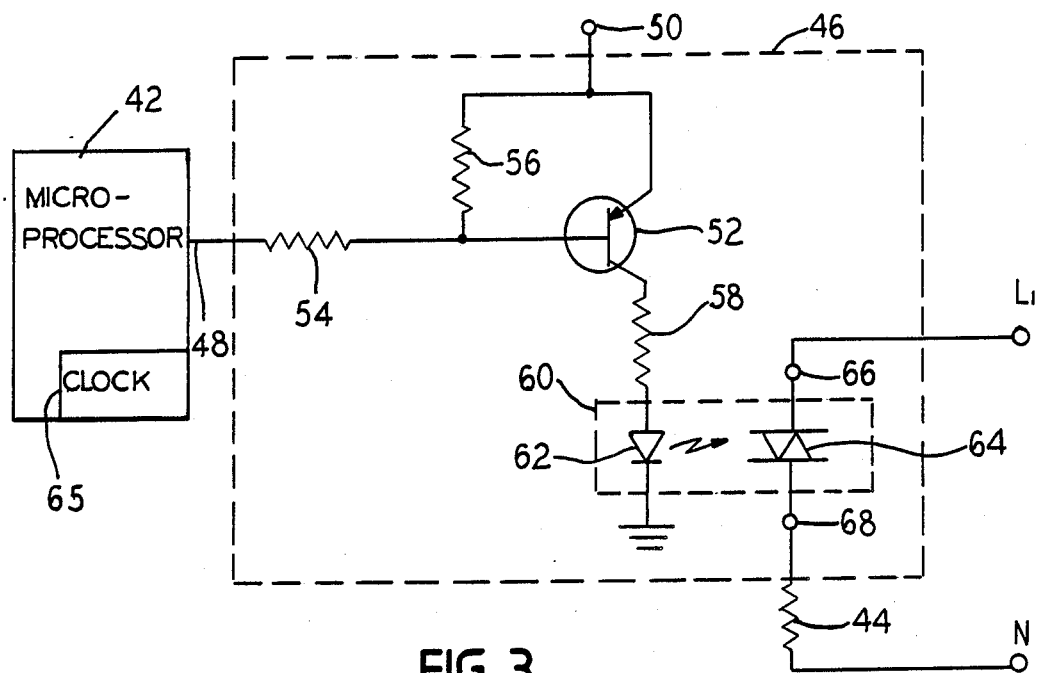
FIG. 3 is a more specific circuit diagram of the control circuit.

FIG. 3 is a circuit schematic of the energizer 46. The energizer 46 is typically connected at terminal 50 to a source of low voltage for powering transistor 52. The base of transistor 52 through resistor 54 receives the enable signal from the microprocessor 42 on line 48. Resistor 56 provides proper biasing for the transistor 52. Transistor 52 has its emitter connected to the terminal 50 and its collector connected through resistor 58 to a optoisolator 60. Within the optoisolator 60 a light-emitting diode 62 receives power when the transistor 52 conducts and emits typically infrared light which activates the triac 64 within the optoisolator 60, the triac 64 having a light responsive gate. The first and second terminals 66 and 68 of the triac 64 are connected in series with the bias heater 44 between the L1 and N terminals of the source of alternating electrical current. Thus as can be seen, the microprocessor periodically provides a signal on line 48 which is connected to the base of transistor 52 thereby turning on transistor 52 in turn causing the triac 64 to turn on and connect the bias heater 44 to the source of electrical power. AC current thereby flows through the triac 64 and the bias heater 44.

The operation of the triac 64 is such that when the transistor 52 conducts the triac 64 will turn on, and provided the transistor 52 is no longer conducting, the triac 64 will turn off at the next zero crossing of the AC current flowing through it. The microprocessor 42 has a clock 65 which in the present embodiment provides a timing function in the microprocessor every 2 milliseconds. The AC current in the present embodiment is 60 Hz and therefore has a half cycle time period of 8.3 milliseconds. Thus, the timing function in the microprocessor is approximately four times faster than the half cycle of the AC current. Any other timing function may be selected for the microprocessor depending upon the application to which it is being used.

Figure 4A:
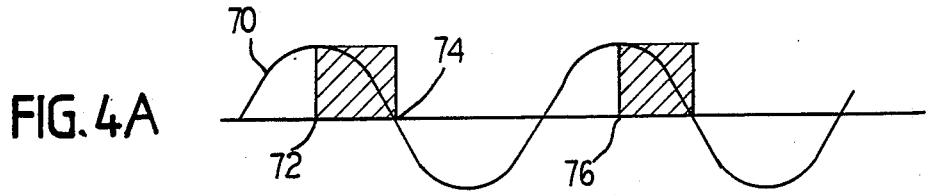
FIGS. 4a through 4f are graphs of waveforms depicting the operation of the FIG. 3 circuit.

FIGS. 4a through 4f depict in graph form the operation of the FIG. 3 circuit. As shown in FIG. 4a the sine wave 70 represents the AC line current supplied between terminals L1 and N. At point 72 the microprocessor 42 has turned on transistor 52 which in turn has caused triac 64 to turn on, connecting the bias heater 44 across the terminals L1 and N. At point in time 74 the triac 64 turns off because the AC line current goes through a zero level. This assumes that the transistor 52 has been turned off by the microprocessor 42 at some time between points 72 and 74. Thus the transistor 52 may either be left on until almost the end of the half cycle or a pulse occurring at point in time 72 of sufficient width to turn on the optoisolator 60 may be utilized. As depicted in FIG. 4a the transistor 52 is not turned on again until point in time 76 thus skipping a half cycle of the AC line current.

Figure 4B:
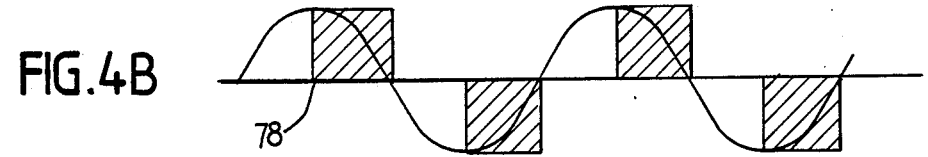
Figure 4C:
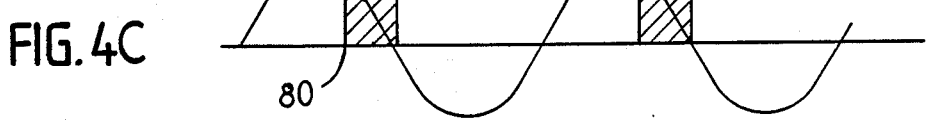
Figure 4D:
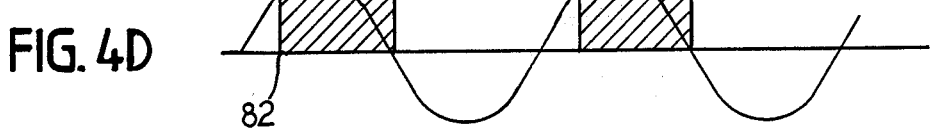

Alternatively as shown in FIG. 4b the transistor 52 and thus the triac 64 may be turned on at point in time 78 which occurs at every half cycle of the AC line current. Thus, the operation depicted in FIG. 4b is energizing the bias heater 44 twice as much as that shown in FIG. 4a. This implies that the dryer air temperature will be lower for the operation depicted in 4b than in FIG. 4a, because the bias heater 44 is being energized to a greater extent.

Depending upon the amount of time that it is desired to energize the bias heater 44, the point in time at which the transistor 52 is turned on may be changed by the microprocessor 42. For example, in FIG. 4c the transistor 52 is turned on at point 80 and in FIG. 4d the transistor 52 and thus the triac 64 is turned on at point 82. The cross hatched areas represents the amount of time that the bias heater 44 has current flowing through it and thereby heating the thermostat 32. It is to be understood that depending upon the desired application the microprocessor 42 can turn on the transistor 52 thereby causing the triac 64 to conduct for every half cycle of the AC line current, for every other half cycle the AC line current, or any other combination, such as every fourth cycle of the AC line current.

Figure 4E:
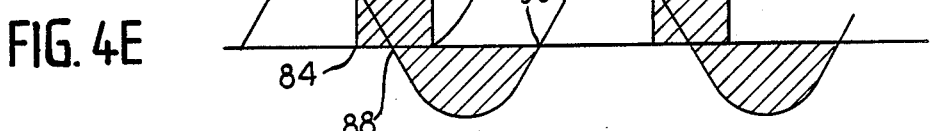
Figure 4F:

In the present embodiment it is also to be understood that it is not necessary for the point in time at which the microprocessor 42 turns on the transistor 52 and the triac 64 to be sychronized to the AC line current. As shown in FIG. 4e the microprocessor 42, irrespective of the phase relation of the AC line current turns on the triac 64 at point in time 84. For this example, the microprocessor 42 provides the enabled signal on the base of the transistor 52 from point in time 84 until point in time 86. Thus, at point in time 88 when the AC line current goes to zero, the triac 64 will turn off, but will immediately turn on again because transistor 52 is still conducting. After point in time 86 the triac 64 will continue to conduct until the next zero crossing of the AC line current at point in time 90. Conversely, as shown in FIG. 4f the enable signal on the base of the transistor 52 begins at point in time 92 and ends at point in time 94, thus transistor 52 conducts between points in time 92 and 94. The triac 64 turns on at point in time 92 and turns off at the next zero crossing of the AC line current at point in time 96. Thus it is to be understood that the operation of the triac 64 being asynchronous with the AC line current causes the triac 64 to remain on a greater or lesser amount depending upon the phase relationship of the enable signal with the AC line current. However, since the bias heater 44 is a relatively slow reacting type device the circuit still effectively operates and controls the temperature of the air in the dryer even though the amount of time that the triac 64 conducts may be not precisely controlled.

Thus it can be seen that the operation of the energizer circuit 46 may be sychronized to the AC line current as shown in FIGS. 4a through 4d or may be asynchronous with the AC line current as shown in 4e and 4f.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

The embodiments of the invention in which an exclusive property or privilege is claimed are defined as follows:

1. A thermostat control circuit comprising:
   a heating circuit having at least a thermostat connected in series with a heating element, said heating circuit connected to a source of alternating electrical power;
   a bias heater located adjacent said thermostat;
   means for providing a temperature level signal; and
   means for periodically energizing the bias heater in response to said temperature level signal.

2. The thermostat control circuit described in claim 1, wherein said means for periodically energizing receives said temperature level signal and has a microprocessor which outputs a periodic enable signal, a transistor receiving said enable signal on a base thereof, said enable signal turning on said transistor, said transistor having a first terminal connected to a source of electrical power and a second terminal connected to a light-emitting diode portion of an optoisolator, said optoisolator having a light responsive portion having first and second terminals connected in series with said source and said bias heater, said light responsive portion connecting said bias heater to said source when said transistor is turned on.

3. A thermostat control circuit comprising:
   a heating circuit having at least a thermostat connected in series with a heating element, said heating circuit connected to a source of alternating electrical power;
   a bias heater located adjacent said thermostat;
   means for providing a temperature level signal;
   a triac having a gate terminal and first and second terminals connected in series with said source and the bias heater;
   means for turning on said triac connected to said gate of said triac, said triac turning off at every zero crossing of AC current flowing through said triac, said AC current having a predetermined time period; and
   means for controlling said means for turning on, said means for controlling periodically energizing said means for turning on in response to said temperature level signal.

4. The thermostat control circuit described in claim 3, wherein said means for controlling is a microprocessor having a clock providing a timing signal, said microprocessor sending an enable signal to said means for turning on to provide a pulse on said gate of said triac as a function of said timing signal.

5. The thermostat control circuit described in claim 3, wherein said means for controlling turns on said triac during every half cycle of the AC current.

6. The thermostat control circuit described in claim 3, wherein said means for controlling turns on said triac during every other half cycle of the AC current.

7. The thermostat control circuit described in claim 3, wherein said means for controlling periodically turns on said triac, a time period of turning on said triac being a multiple of said predetermined time period of said AC current.

8. The thermostat control circuit described in claim 3, wherein said periodically turning on said triac is asynchronous with said predetermined time period of said AC current.

9. The thermostat control circuit described in claim 3, wherein said means for turning on has a transistor with an output connected to a light-emitting diode and wherein said triac is an optically activated triac which is turned on by light emitted from said light-emitting diode, said means for controlling providing an enable signal on a base of said transistor causing said transistor to activate said light-emitting diode, thereby emitting said light.

10. A thermostat control circuit comprising:
    a heating circuit having at least a thermostat connected in series with a heating element, said heating circuit connected to a source of alternating electrical power;
    a bias heater located adjacent said thermostat;
    means for providing a temperature level signal;
    a microprocessor receiving said temperature level signal and having a clock for providing a timing signal, said microprocessor outputting a periodic enable signal having a time period which is a function of said timing signal;
    at least one transistor receiving said enable signal on a base thereof, said enable signal causing said transistor to turn on and off, said transistor having an output; and
    a triac having a gate connect to said output of said transistor and first and second terminals connected in series with the bias heater between first and second terminals of the source of alternating electrical power.

11. The thermostat control circuit described in claim 10, wherein said control circuit further comprises an optoisolator having a light-emitting diode connected to said output of said transistor, said triac being a part of said optoisolator and having a light activated gate responsive to light emitted by said diode.

12. The thermostat control circuit described in claim 10, wherein said enable signal has a time period greater than a time period of the alternating electrical power, said enable signal causing said transistor to turn on once every N half cycles of the alternating power, where N is a whole number.

13. The thermostat control circuit described in claim 12, wherein said enable signal further causes said transistor to turn off after a predetermined amount of time, said triac turning off at the next zero crossing of alternating current flowing through the triac.

14. The thermostat control circuit described in claim 10, wherein said periodic enable signal is synchronized with alternating current flowing through the triac.

15. The thermostat control circuit described in claim 10, wherein said periodic signal is asynchronous with alternating current flowing through the triac.

* * * * *